March 31, 1970  W. L. FLEETWOOD  3,503,941
PRODUCTION OF ACRYLIC POLYMERS
Filed May 20, 1968
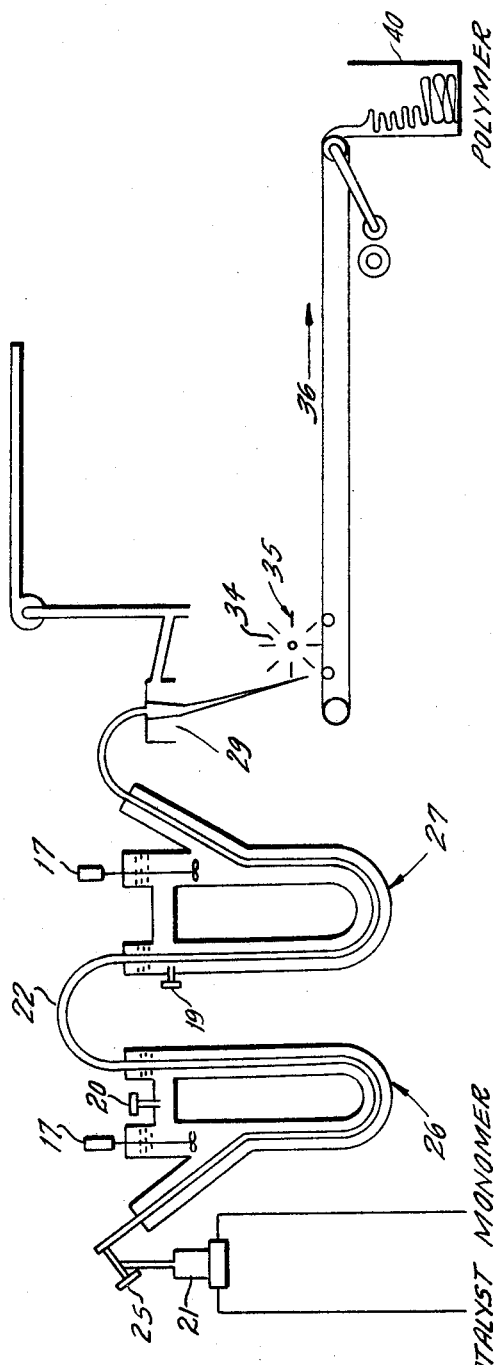
INVENTOR
WILLIAM LILE FLEETWOOD
By
OSTROLENK, FABER, GERB & SOFFEN
ATTORNEYS

United States Patent Office 3,503,941
Patented Mar. 31, 1970

3,503,941
PRODUCTION OF ACRYLIC POLYMERS
William Lile Fleetwood, Warren, N.J., assignor to Colloids, Inc., Newark, N.J., a corporation of New Jersey
Filed May 20, 1968, Ser. No. 730,248
Int. Cl. C08f 15/00, 3/90; B28d 1/32
U.S. Cl. 260—80                                    6 Claims

ABSTRACT OF THE DISCLOSURE

Dry acrylic polymers, such as polyacrylic acid are produced in a fibrous crystalline form which may be readily broken up for shipping and use by rapid solution in water. The polymers are produced by the sequential steps of polymerizing an aqueous solution of acrylic acid containing more than 65% by weight of monomer in a pressurized and heated reaction zone, extruding the polymer and stretching the extruded polymer to yield a fibrous brittle ribbon of reduced cross section.

Field of the invention

The preparation of dry, water-soluble acrylic polymers.

Description of the prior art

Polymers of acrylic acid and other vinyl monomers have heretofore been commercially produced by solution polymerization techniques, due to the fact that the bulk polymerization of pure acrylic acid, for example, may become extremely violent (see, for example, Vinyl and Related Polymers, Schildknecht, 1952, page 298) and involve the risk of explosion. Such procedures, which yield relatively dilute solutions, are, however, less economical to carry out in large scale operations, as compared with bulk reactions, and the resulting diluted product is expensive to transport.

These procedures do not produce substantially dry polymer products and there is an inherent expense and difficulty in drying the dilute water solutions of the polymer products which are formed. Spray drying is expensive and difficult to perform because of webbing. Drum drying is unsatisfactory because it would necessitate the use of drums coated with polytetrafluoroethylene coatings, which coatings would not hold up in subsequent scraping operations. Finally, tray drying would be slow and nevertheless require a final grinding operation.

It has been sought to avoid the preceding disadvantages by conducting the polymerization in organic solvents in which the polymer product is insoluble, and from which it may be removed by filtration, subsequently dried, and then ground. Such procedure is not, however, satisfactory in view of the unavoidable and expensive solvent losses and the concomitant introduction of toxicity and inflammability problems.

While the polymerization of dry acrylic acid salts has been described in Glavis U.S. Patent No. 3,058,958, such process utilizes solutions containing relatively low monomer concentrations between 20 to 50% and, depending on the temperature utilized, will produce polymer salts having high molecular weights between about 50,000 and 1,500,000. If higher monomer concentrations were used in this method, these solutions would become gummy and difficult to handle during drying.

Summary of the invention

In the present invention, a substantially dry polymer is obtained which is suitable for direct shipment and use by the customer typically as a size for textiles, an adhesive, or a water-treatment agent. Such polymer will have a moisture content less than about 10%, by weight, and preferably less than 6%. The polymer has a relatively low molecular weight (about 10,000 to 40,000) but is best characterized in that a 25% aqueous solution, at 75° F. thereof has a viscosity in the range of about 100 to 6000 cp. and preferably in the range of about 100 to 500 cp.

In accordance with this invention, it has been found that acrylic acid or other vinyl monomers, preferably methacrylic acid, and acrylamide may be homopolymerized or copolymerized with each other to produce substantially dry, water-soluble polymers by conducting the polymerization reaction in the presence of a free radical catalyst and a diluent, with the latter incorporated in the monomer-containing mixture in a limited amount such that the diluent is substantially removed from the polymer-containing reaction product by the heat produced during the polymerization.

In the process of the present invention the monomer is mixed with an aqueous solution of a free radical catalyst and passed sequentially through a two-stage reaction zone. Both stages are immersed in separate temperature control baths, containing a heat transfer fluid as Dowtherm. The first stage is thermostatically controlled to maintain a temperature sufficient to initiate a satisfactory rate of polymerization and the second stage, which may also be thermostatically controlled, operates and regulates the temperature of the exothermic polymerization reaction. After passing through the second stage of the reactor, the polymer is extruded through a nozzle as a rope or ribbon which is seized between a belt and the Teflon-coated blades of a take-away wheel which is rotating faster than the flow rate of the extruded polymeric material. Thus, the polymeric material is stretched into its desirable fibrous crystalline form, deposited upon a Teflon-coated belt and the fibrous ribbon carried on this belt during which passage it is cooled substantially to ambient temperature and deposited in a container for ultimate crushing and shipment.

In this polymerization system, it is important that the elevated pressure and temperature of the polymer prior to extrusion be maintained at such a level that upon passage through the extrusion nozzle, substantially all of the diluent in the extrudate flashes off so as to result in a dry polymer of less than 10%, and preferably less than 6% moisture. The feed should contain more than 65% monomer, preferably between about 70% and 75% monomer by weight.

Preferred embodiments of the invention

The drawing illustrates an apparatus for carrying out the invention.

In the preferred modification of the process, substantially anhydrous acrylic acid is used. A solution of free radical catalyst in an aqueous diluent is prepared which solution may contain a water-miscible solvent. It is preferred to utilize a catalyst solution containing between 3 and 7% suitably between 5 and 5.5% by weight of the catalyst, except that in the polymerization of acrylamide, catalyst solutions of less than 1% may be used. Any water-soluble free radical catalyst may be utilized. Among such catalysts are the inorganic peroxides, e.g., hydrogen peroxide, barium peroxide, and salts of inorganic peracids, e.g., ammonium persulfate, sodium persulfate, potassium persulfate, sodium perborate, potassium perborate, etc.

The monomer and the aqueous catalyst solution are pumped into mixing chamber 21 to produce a feed containing between 65 and 80%, preferably at least 70%, and most suitably 70 to 75% by weight of a monomer. The flow rate of the monomer and the aqueous catalyst solution are of course dependent upon the diameter of the reaction tube, the length of the reaction chamber, and the diameter of the orifice from which the final product is extruded.

In the preferred modification of the process, the diameter of the reaction tube 22 is 1⅜ inches. Under these operating conditions, the ratio of the flow rate of catalyst solution to monomer into the mixing chamber is in the region of from about 1:3 to about 1:2, that is to say, the monomer flow rates are in the range of 40 to 200 pounds per hour and the catalyst flow rate (solution) is of the order of from 15 to 100 pounds per hour.

The polymerization reaction takes place at a reactor pressure of up to 500 pounds per square inch; operating pressure of between 50 and 200 pounds per square inch are practical, whereas pressures of between 80 to 100 pounds per square inch are especially preferred. From mixing vessel 21, the monomer/catalyst mixture, at ambient temperature, flows into reaction tube 22 which passes through bath 26 which is maintained at a temperature which depends on the flow rate of the feed mixture, and could range between about 120° F. and 400° F. In this first segment of the reactor, the polymerization reaction is initiated and becomes exothermic. The reacting mixture then continues through tube 22 and bath 27, which is maintained at a temperature in the range of 280° to 400° F. It is important to control the temperature of the first bath in order that the polymerization reaction does not proceed too rapidly in the initial stages of the reaction and occur too close to the inlet of the reactor. The temperature of the second stage bath is not so limited. The bath temperatures are maintained by agitation of the Dowtherm by mixers 17 and temperatures of the heat transfer fluid and feed are recorded respectively by thermometers 19, 20 and 25. The residue time of the feed mixture in the reaction zones can vary considerably depending on the various reaction conditions, but generally will be from 2 to 15 minutes, and, preferably between about 4 to 8 minutes.

After passing through the second stage of the reaction system, the polymer is extruded through a flat nozzle 29 with an orifice typically having an opening ½" x 4". As will be seen from the suggested operating temperatures shown hereinabove, the temperature of the polymer at the nozzle, has been raised substantially above the boiling point of water by the exotherm of the polmyerization reaction itself. Hence, when the polymer is extruded from the nozzle, its temperature at extrusion point is sufficient to allow virtually all of the water in the extruded mixture to evaporate virtually immediately.

The extruded polymer falls on to blades 35 of the take-away wheel 34 and passes between the blades and a coated belt 36. The blades are coated with a material to which the polymer will substantially not adhere as in the nozzle 29. A preferred coating is polytetrafluorethylene. The ends of the blades 35 are moving in substantially the same direction as the polymer at a higher linear velocity than the linear velocity of extrusion of the polymer. Thus, where the typical linear velocity of extrusion is from about ¼ foot per second, the tips of the blades are traveling at a rate of 1 foot per second. The linear velocity of the tips of the blades and the belt are faster than the rate of extrusion of the polymer as this is the means by which the extruded material may be stretched into the desired fibrous crystalline form. The absolute speed of rotation of the wheel 34 is not critical, neither is the degree of difference in speed between the blade tips and the original speed of the extruded polymer. However, it is desirable that the speed differential be such that the extruded polymer is stretched to about ¼ of its original diameter. The polymer ribbon may have round or rectangular cross section, a flat, thin ribbon being preferred as it dries faster upon leaving the extrusion nozzle.

The stretched ribbon is carried along a Teflon belt 36, which travels at a rate of about 4 to 5 times the rate of extrusion of the polymer, while on the belt the polymer is cooled. It then falls into a suitable container 40, and is subsequently ground and prepared for shipment.

The process of the present invention is illustrated in the following examples which it will be understood are illustrative but not limiting thereof.

An aqueous solution of catalyst is prepared by dissolving 1.8 lbs. of ammonium persulfate in 4 gallons of water. Similar results are achieved with sodium and potassium persulfate and hydrogen peroxide. The catalyst solution and substantially anhydrous acrylic acid monomer are pumped by separate pumping devices into a mixing chamber from whence they pass through a Teflon coated reaction tube. The reaction tube passes through two temperature moderating baths equipped with stirring mechanisms to agitate the heat transfer fluid. As the reaction mixture passes through the reaction tube, the proportion of polymerized material increases until, at the nozzle polymerization, it is substantially complete. The polymerized material passes out of the nozzle onto the Teflon-coated blades of a rotating take-away wheel, which stretches the extruded polymer and deposits it upon a Teflon-coated belt which conveys it into a receiving drum. Typical operating conditions are exemplified in the table below.

TABLE

| Example Nos. | 1 | 2 | 3 | 4 |
|---|---|---|---|---|
| (1) Pump rates: | | | | |
| Monomer, lbs./hr | 72.2 | 57.0 | 61.0 | 221 |
| Catalyst, lbs./hr | 27.5 | 20.5 | 23.7 | 82 |
| (2) Monomer spec., percent | 99.5 | 99.5 | 99.5 | 99.5 |
| Catalyst solution spec. (percent in water) | 5.25 | 5.32 | 5.32 | 5.27 |
| (3) Pressure (p.s.i.g.) of reactor | 70-80 | 60-100 | 90-100 | 60 |
| (4) Temperature (° F.): | | | | |
| As pumped | 70 | 70 | 70 | 84 |
| First jacket (bath) | 132 | 132 | 125-128 | 324 |
| Second jacket (bath) | 280±5 | 310 | 290-400 | 330 |
| As extruded 3" from nozzle | | | 250 | |
| (5) Monomer in feed, percent | 72.2 | 73.2 | 71.7 | 72.0 |
| (6) Viscosity of 25% solution of prod. at 75° F. (cps.) (as measured by Brookfield viscosimeter) | 197 | 196 | 180 | 180 |
| (7) Moisture, percent in ground product | 5.5 | 5.5 | 5.6 | 5.7 |

Results similar to those shown above are obtained with other free-radical water soluble catalysts hereinbefore referred to, e.g., potassium persulfate and hydrogen peroxide, although in each case some modification of the catalyst concentration may be desirable.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

I claim:
1. A process for the production of substantially dry polymers selected from the group consisting of homopolymers and copolymers of acrylic acid, methacrylic acid, and acrylamide which comprises
   (1) polymerizing the monomeric material in the presence of a water-soluble free radical catalyst and aqueous diluent in a pressurized reaction zone maintained at an elevated pressure of up to about 500 p.s.i. and a temperature of from about 120° F. to about 400° F., said monomer being present in an amount of at least 65 percent by weight of the monomer-containing reaction mixture; and
   (2) extruding hot polymer from said reaction zone whereby said diluent rapidly evaporates so as to produce a substantially dry polymer.
2. The process of claim 1 in which the monomer is acrylic acid.
3. The process of claim 2 in which the dry polymer contains less than 6% water.
4. The process of claim 3 wherein the polymerization step comprises:
   (1) mixing acrylic acid monomer and aqueous solution of catalyst to provide a feed containing:

(a) between about 65 and 80% (by weight) of monomer;
(b) an aqueous solution containing between about 3 and 7% (by weight) of a water-soluble free radical catalyst;
(c) water, and (2) sequentially passing the reaction mixture through a reaction zone maintained at elevated pressures and elevated temperatures of from about 120° F. to about 400° F.

5. The process of claim 4 wherein the feed contains
(1) between 70 and 75% (by weight) of monomer; and
(2) an aqueous solution containing between 5 and 5.5% (by weight) of catalyst.

6. The process of claim 1 wherein the substantially dry polymer is extruded in the form of a ribbon, and wherein said ribbon is stretched into dry crystalline fibrous form, thereby producing a dry fibrous acrylic polymer.

References Cited

UNITED STATES PATENTS

| | | | |
|---|---|---|---|
| 2,856,395 | 10/1958 | Richard et al. | 260—94.9 |
| 3,058,958 | 10/1962 | Glavis | 260—80.3 |
| 3,276,076 | 10/1966 | Ryan et al. | 18—12 |
| 3,405,106 | 10/1968 | Scanley | 260—80 |

FOREIGN PATENTS 777,306  6/1957  Great Britain.

JOSEPH L. SCHOFER, Primary Examiner

C. A. HENDERSON, JR., Assistant Examiner

U.S. Cl. X.R.

260—80.3, 89.7; 264—182, 210